(12) United States Patent
Mysen et al.

(10) Patent No.: US 10,282,756 B2
(45) Date of Patent: May 7, 2019

(54) MANAGING REVENUE SHARING BIDS

(75) Inventors: Clarence C. Mysen, San Francisco, CA (US); Khanh B. Nguyen, Cupertino, CA (US); Jennifer Liu Low, Cupertino, CA (US); Alice S. Tull, Mountain View, CA (US); Gregory J. Friedman, Mountain View, CA (US); Christopher M. Roat, Mountain View, CA (US)

(73) Assignee: Google LLC, Mountain View, CA (US)

( * ) Notice: Subject to any disclaimer, the term of this patent is extended or adjusted under 35 U.S.C. 154(b) by 1058 days.

(21) Appl. No.: 13/813,884

(22) PCT Filed: Aug. 6, 2010

(86) PCT No.: PCT/US2010/044793
§ 371 (c)(1),
(2), (4) Date: Feb. 1, 2013

(87) PCT Pub. No.: WO2012/018352
PCT Pub. Date: Feb. 9, 2012

(65) Prior Publication Data
US 2013/0132201 A1    May 23, 2013

(51) Int. Cl.
*G06Q 30/02*    (2012.01)

(52) U.S. Cl.
CPC ................. *G06Q 30/0274* (2013.01)

(58) Field of Classification Search
CPC ................ G06Q 30/0207; G06Q 30/284
USPC ............................... 705/14.1, 14.73
See application file for complete search history.

(56) References Cited

U.S. PATENT DOCUMENTS

| | | | |
|---|---|---|---|
| 6,285,999 B1 | 9/2001 | Page | |
| 2006/0212350 A1* | 9/2006 | Ellis | G06Q 30/0242 705/14.41 |
| 2009/0012852 A1 | 1/2009 | O'Kelley et al. | |
| 2009/0055267 A1 | 2/2009 | Roker | |
| 2009/0276305 A1* | 11/2009 | Clopp | G06Q 30/00 705/14.16 |
| 2010/0070367 A1 | 3/2010 | Ananian | |
| 2010/0082439 A9* | 4/2010 | Patel | G06Q 30/02 705/14.72 |
| 2011/0125593 A1* | 5/2011 | Wright | G06Q 30/02 705/14.73 |

OTHER PUBLICATIONS

Edelman & Lee, "CPC/CPA hybrid bidding in a second price auction", 2008, HBS Working Paper 09-074, Harvard Business School pp. 1-19 (Year: 2008).*

(Continued)

*Primary Examiner* — John Van Bramer
(74) *Attorney, Agent, or Firm* — Fish & Richardson P.C.

(57) ABSTRACT

A bid for a content slot from a content provider is received. The bid includes a revenue-sharing bid. It is determined that the bid is a winning bid and content is presented from the content provider in the content slot. Presentation details are logged that include a time when the content was presented. At a later time, an indication is received of an action, the indication including an indication that the action is responsive to the content having been presented previously. Based on the action, the content provider is charged an appropriate amount based on the revenue sharing bid.

14 Claims, 7 Drawing Sheets

(56) References Cited

OTHER PUBLICATIONS

Office Action issued in Australian Application No. 2010358588 dated Aug. 25, 2014, 4 pages.
Office Action issued in Canadian Application No. 2,807,465 dated Oct. 11, 2016, 7 pages.
International Search Report and Written Opinion in International Application No. PCT/US2010/44793, dated Sep. 20, 2010, 12 pages.
International Preliminary Report on Patentability in International Application No. PCT/US2010/044793, dated Feb. 21, 2013, 7 pages.
Brin and Page, "The Anatomy of a Large-Scale Hypertextual Search Engine," Seventh International World Wide Web Conference, Brisbane Australia, 1998, 20 pages.
Office Action issued in Canadian Application No. 2,807,465, dated Oct. 2, 2017, 7 pages.

* cited by examiner

MANAGING REVENUE SHARING BIDS

CROSS-REFERENCE TO RELATED APPLICATION

This application is National Stage Application under 35 U.S.C. § 371 and claims the benefit of International Application No. PCT/US2010/044793, filed on Aug. 6, 2010. The disclosure of the foregoing application is hereby incorporated by reference in its entirety.

TECHNICAL FIELD

This disclosure relates generally to managing revenue sharing bids.

BACKGROUND

Interactive media (e.g., the Internet) has great potential for improving the targeting of advertisements ("ads") to receptive audiences. For example, some websites provide information search functionality that is based on keywords entered by the user seeking information. A user query can be an indicator of the type of information of interest to the user. By comparing the user query to a list of keywords specified by an advertiser, it is possible to provide targeted ads to the user.

Another form of online advertising is ad syndication, which allows advertisers to extend their marketing reach by distributing ads to additional partners. For example, third party online publishers can place an advertiser's text or image ads on web properties with desirable content to drive online customers to the advertiser's website.

SUMMARY

Systems, methods and apparatus for managing revenue sharing bids are disclosed. In one implementation, a bid for a content slot from a content provider is received. The bid includes a revenue-sharing bid. It is determined that the bid is a winning bid and content is presented from the content provider in the content slot. Presentation details are logged that include a time when the content was presented. At a later time, an indication is received of an action, the indication including an indication that the action is responsive to the content having been presented previously. Based on the action, the content provider is charged an appropriate amount based on the revenue sharing bid.

In another implementation, an interface is presented by an advertising system to a content provider for preparing a bid for one or more content slots, the interface including a selection option of a type of bid selected from the group of fixed bid and revenue-sharing bid. The advertising system receives a bid for a content slot from a content provider, the bid including a revenue-sharing bid. The advertising system receives a request to fill the content slot, the content slot being presented along with search results in a search results page responsive to receipt of a search result query or an ad slot to be filled on a publisher's web page. The advertising system determines that the bid is a winning bid and presents content from the content provider in the content slot to a user. The advertising system logs presentation details including a time when the content was presented. The advertising system receives an indication of a selection by the user of the content presented. A redirect in response to the indication of the selection is provided so as to support a session between the user and the content provider including storing a cookie on a client associated with the computer that includes details of the selection. The advertising system receives an indication of an action completed by the user as either part of the session or a subsequent session between the user and the content provider, where receiving includes receiving the cookie and details associated with the action. Based on the action, the content provider is charged an appropriate amount based on the revenue sharing.

In another implementation, a client computer associated with a user provides a request for content comprising a search request. A response is received to the search request including search results and one or more additional content items. A selection is provided of the one or more additional content items. A cookie is stored on the client including details of the selection. An action is performed during a session with a sponsor of content associated with the selection. A browser associated with the client receives a uniform resource locator that includes details of the action and that is responsive to the action. A page request is provided to an advertising system including providing the URL and the cookie to the advertising system so that details of the action and the selection are provided to the advertising system.

In another implementation, either a client computer associated with a user or a publisher associated with a content source being accessed by the user receives a request for content comprising an ad request. One or more content items are provided in response to the ad request. An indication is received of a selection of one of the one or more content items. A cookie is stored on the client computer including details of the selection. An indication is received that the user performed an action during a session with a sponsor of content associated with the selection including receiving the cookie where the indication is of the form of a uniform resource locator that includes details of the action and that is responsive to the action. The sponsor is charged based on the action.

These and other implementations can optionally include one or more of the following features. Receiving the bid includes receiving a bid associated with an ad to be included in a search results page. Receiving the bid includes receiving a bid associated with an ad to be published on a publisher's web page. Determining a winning bid includes determining that the bid is a winning bid as compared to other revenue sharing bids. Determining a winning bid includes determining the bid is a winning bid in an auction with other revenue sharing bids and other fixed priced bids. Logging presentation details includes logging a time associated with the presentation and an expiration time for determining revenue allocation associated with the presentation. The presentation details further include information identifying one or more of the content provider, the content, and the presentation. Receiving the indication includes receiving transaction details associated with a user interaction with the content provider that can be attributed to the content presentation. Receiving the indication includes receiving a page request that includes the transaction details. Receiving the indication includes receiving a cookie that includes details of the content presentation. Charging includes using the cookie to locate the logged presentation details. Receiving an indication includes receiving information relating to the transaction details. Receiving the indication includes receiving a URL that includes the transaction details. Charging includes using the transaction details and the revenue sharing bid to charge the content provider.

The details of one or more embodiments of the subject matter described in this specification are set forth in the accompanying drawings and the description below. Other features, aspects, and advantages of the subject matter will become apparent from the description, the drawings, and the claims.

BRIEF DESCRIPTION OF THE DRAWINGS

Like reference numbers indicate like elements.

DETAILED DESCRIPTION

Methods, systems, and apparatus including computer program products are described that relate to the distribution of information. Content providers (e.g., advertisers) may provide one or more bids in an auction whose value is known at the time of bid. Some content providers may provide a bid in an auction whose value is unknown at the time of bid, such as for example, bids that are tied to a percentage of revenue sharing. Techniques are described for valuing both types of bids, comparing them, and pricing them so as to provide efficient delivery of content through a content delivery system.

Figure 1:
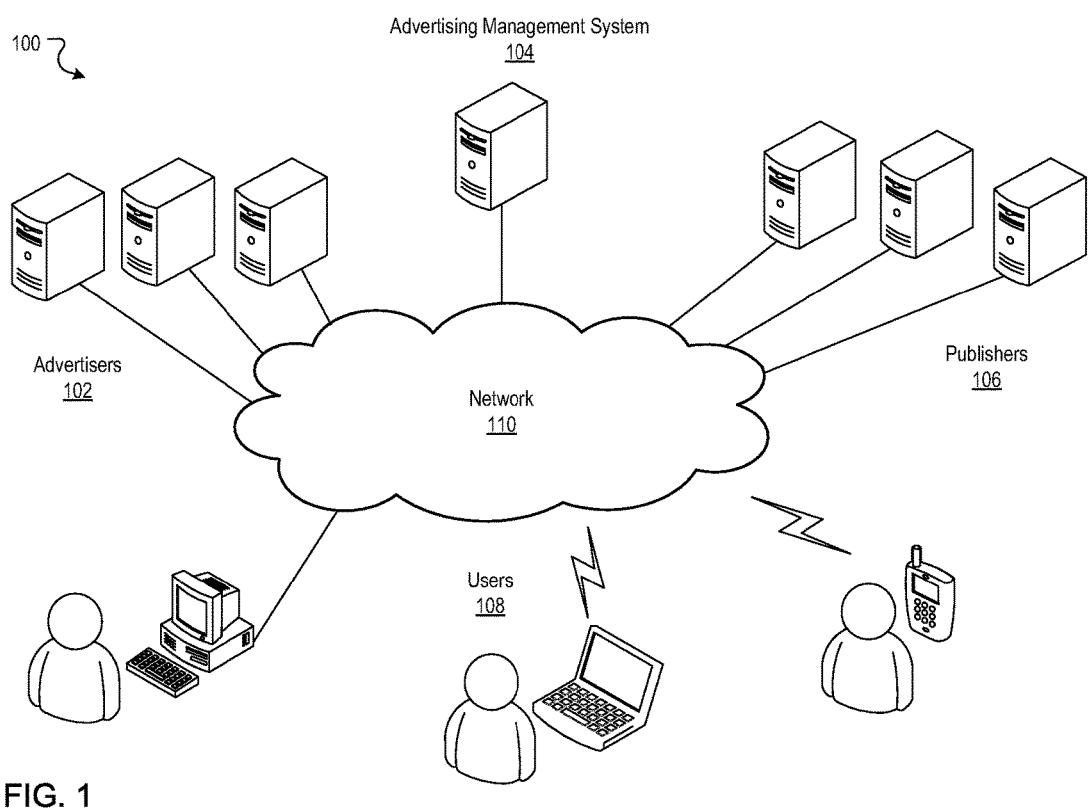
FIG. 1 is a block diagram of an example online advertising system.

FIG. 1 is a block diagram of an example an online advertising system 100. In some implementations, one or more advertisers 102 can directly, or indirectly, enter, maintain, and track advertisement ("ad") information in an advertising management system 104. Though reference is made to advertising, other forms of content, including other forms of sponsored content, can be delivered by the system 100. The ads may be in the form of graphical ads, such as banner ads, text only ads, image ads, audio ads, video ads, ads combining one of more of any of such components, etc. The ads may also include embedded information, such as a links, meta-information, and/or machine executable instructions. One or more publishers 106 may submit requests for ads to the system 104. The system 104 responds by sending ads to the requesting publisher 106 (or directly to an end user) for placement on one or more of the publisher's web properties (e.g., websites and other network-distributed content). The ads can include embedded links to landing pages, e.g., pages on the advertisers 102 websites, that a user is directed to when the user clicks an ad presented on a publisher website.

Other entities, such as users 108 and the advertisers 102, can provide usage information to the system 104, such as, for example, whether or not a conversion or click-through related to an ad has occurred. This usage information can include measured or observed user behavior related to ads that have been served. The system 104 performs financial transactions, such as crediting the publishers 106 and charging the advertisers 102 based on the usage information.

A computer network 110, such as a local area network (LAN), wide area network (WAN), the Internet, or a combination thereof, connects the advertisers 102, the system 104, the publishers 106, and the users 108.

One example of a publisher 106 is a general content server that receives requests for content (e.g., articles, discussion threads, music, video, graphics, search results, web page listings, information feeds, etc.), and retrieves the requested content in response to the request. The content server (or a user that is accessing the content source by way of a redirect) may submit a request for ads to an ad server in the system 104. The ad request may include a number of ads desired. The ad request may also include content request information. This information can include the content itself (e.g., page or other content document), a category corresponding to the content or the content request (e.g., arts, business, computers, arts-movies, arts-music, etc.), part or all of the content request, content age, content type (e.g., text, graphics, video, audio, mixed media, etc.), geo-location information, etc.

In some implementations, the content server can combine the requested content with one or more of the ads provided by the system 104. This combined content and ads can be sent to the user 108 that requested the content for presentation in a viewer (e.g., a browser or other content display system). Alternatively, the content can be combined at a user's device (e.g., by combining in a user's browser content from the content source with ads provided by the system 104). The content server can transmit information about the ads back to the ad server, including information describing how, when, and/or where the ads are to be rendered (e.g., in HTML or JavaScript™).

Another example publisher 106 is a search service. A search service can receive queries for search results. In response, the search service can retrieve relevant search results from an index of documents (e.g., from an index of web pages). An exemplary search service is described in the article S. Brin and L. Page, "The Anatomy of a Large-Scale Hypertextual Search Engine," Seventh International World Wide Web Conference, Brisbane, Australia and in U.S. Pat. No. 6,285,999, both of which are incorporated herein by reference each in their entirety. Search results can include, for example, lists of web page titles, snippets of text extracted from those web pages, and hypertext links to those web pages, and may be grouped into a predetermined number of (e.g., ten) search results.

The search service can submit a request for ads to the system 104. The request may include a number of ads desired. This number may depend on the search results, the amount of screen or page space occupied by the search results, the size and shape of the ads, etc. In some implementations, the number of desired ads will be from one to ten, or from three to five. The request for ads may also include the query (as entered or parsed), information based on the query (such as geo-location information, whether the query came from an affiliate and an identifier of such an affiliate), and/or information associated with, or based on, the search results. Such information may include, for example, identifiers related to the search results (e.g., document identifiers or "docIDs"), scores related to the search results (e.g., information retrieval ("IR") scores), snippets of text extracted from identified documents (e.g., web pages), full text of identified documents, feature vectors of identified documents, etc. In some implementations, IR scores can be computed from, for example, dot products of feature vectors corresponding to a query and a document, page rank scores, and/or combinations of IR scores and page rank scores, etc.

The search service can combine the search results with one or more of the ads provided by the system 104. This combined information can then be forwarded to the user 108 that requested the content. The search results can be maintained as distinct from the ads, so as not to confuse the user between paid advertisements and presumably neutral search results.

Finally, the search service can transmit information about the ad and when, where, and/or how the ad was to be rendered back to the system 104.

As can be appreciated from the foregoing, the advertising management system 104 can serve publishers 106, such as content servers and search services. The system 104 permits serving of ads targeted to documents served by content servers. For example, a network or inter-network may include an ad server serving targeted ads in response to requests from a search service with ad spots for sale. Suppose that the inter-network is the World Wide Web. The search service crawls much or all of the content. Some of this content will include ad spots (also referred to as "inventory") available. More specifically, one or more content servers may include one or more documents. Documents may include web pages, email, content, embedded information (e.g., embedded media), meta-information and machine executable instructions, and ad spots available. The ads inserted into ad spots in a document can vary each time the document is served or, alternatively, can have a static association with a given document.

In some examples, the advertisement management system 104 may include an auction process to select advertisements. Advertisers may be permitted to select, or bid, an amount the advertisers are willing to pay for each click of an advertisement, e.g., a cost-per-click amount an advertiser pays when, for example, a user clicks on an advertisement. The cost-per-click can include a maximum cost-per-click, e.g., the maximum amount the advertiser is willing to pay for each click of advertisement based on targeting criteria (e.g., one or more keywords). For example, advertisers A, B, and C all select, or bid, a maximum cost-per-click of $0.50, $0.75, and $1.00, respectively. The maximum amount advertiser A will pay for a click is $0.50, the maximum amount advertiser B will pay is $0.75, and the maximum amount advertiser C will pay is $1.00.

The rank of an advertisement that is displayed can be determined by multiplying the maximum cost-per-click for the advertisement by a quality score of the advertisement. The advertisement can then be placed among other advertisements in order of increasing or decreasing rank. For example, suppose the quality score of advertisers A, B, and C are "3," "1," and "1," respectively. The rank of advertiser A, B, and C can be determined as follows:

A: Rank=quality score×maximum cost-per-click=3.0×$0.50=1.50

B: Rank=quality score×maximum cost-per-click=1.0×$0.75=0.75

C: Rank=quality score×maximum cost-per-click=1.0×$1.00=1.00

The advertisers can be ranked as follows:

1. A
2. C
3. B

The advertisements can also be priced and ordered according to a second price auction. In addition to the cost-per-click of the advertisement and the quality score of the advertisement, a second price auction may adjust the price of an advertisement at bidding time by considering the amount selected or bid by the advertiser directly ranked below a given advertisement. For example, the "second price" (sometimes referred to as an "actual cost per click") of an advertisement can be the price that is necessary to keep the advertisement's position above the next advertisement.

To determine the second price, the system 104 can determine how much the advertiser in position 1 would have to pay to give them a rank equal to the advertiser in position 2, and then the system 104 adds a unit amount, e.g., $0.01, to this determined amount.

To determine how much the advertiser in position 1 would have to pay to give them a rank equal to the advertiser in position 2, the rank of position 2 can be divided by the quality score of position 1 and $0.01 can be added to that amount. The last advertiser in the list can pay a minimum cost-per-click to hold the position in the list. For example, suppose the minimum cost-per-click is $0.20. The second price of advertisers A, B, and C can be determined as follows:

A: C's rank/A's quality score=⅓=$0.33+$0.01=$0.34

C: B's rank/C's quality score=0.75/1=$0.75+$0.01=$0.76

B: minimum cost-per-click=$0.20

In this example, A would only have to pay $0.34 to hold the first position in the list of advertisements. C would have to pay $0.76 to hold the second position. Advertiser B would be required to pay the minimum cost-per-click amount of $0.20.

Another metric for ranking and valuing advertisements is effective cost-per-thousand impressions (eCPM). The eCPM value represents the estimated earnings for every 1000 "impressions" an advertiser receives. An impression refers to the number of times a web page or pages containing a particular advertisement are shown to page visitors.

When the cost-per-click is known, such as in the auction scheme described above, eCPM can be calculated according to the following formula:

$$eCPM=1000 \times CPC \times (\text{Probability of Click})$$

The probability of click factor can be supplied based on historical data associated with an advertisement, a merchant, industry-wide data, or other factors. Thus, when an advertiser provides a cost-per-click bid, the eCPM formula can represent an advertiser's estimated earnings for every 1000 impressions received. Second price auctions such as those described above can also use eCPM values to create a second price value for an advertisement.

In some situations, instead of bidding for an advertisement on a cost-per-click basis, an advertiser might prefer to place bids on an advertisement based on other factors. For example, an advertiser may wish to bid using a revenue sharing bid. In some examples, a revenue sharing bid is a bid for an advertisement based on a fraction of the advertiser's sales which are attributable to a given advertisement, and may be sales associated with a single product, related products, categories of products, or plural categories, or alternatively may be related to sales at a location, in a given time, or in accordance with other agreed upon sharing of revenue. Other forms of revenue sharing are possible as agreed to between the advertiser and the advertising management system. This manner of bid may allow an advertiser to have greater control over their return on investment, as the cost of an advertisement correlates closely with the sales generated by that advertisement. However, because advertisers bid for advertisements prior to generating sales based on those advertisements, a mechanism is required for dealing with the unknown values, such as purchase values, in order to combine revenue-share bids with cost-per-click bids in the same auction. These bidding and auction techniques are described in greater detail below, for example, in connection with FIGS. 4 and 5. Furthermore, once an advertiser has specified a set of revenue-sharing bids, a mechanism is also required for tracking whether a particular sale resulted from a user clicking on an advertisement associated with a revenue-sharing bid (a "revenue-sharing advertisement")

Figure 2:
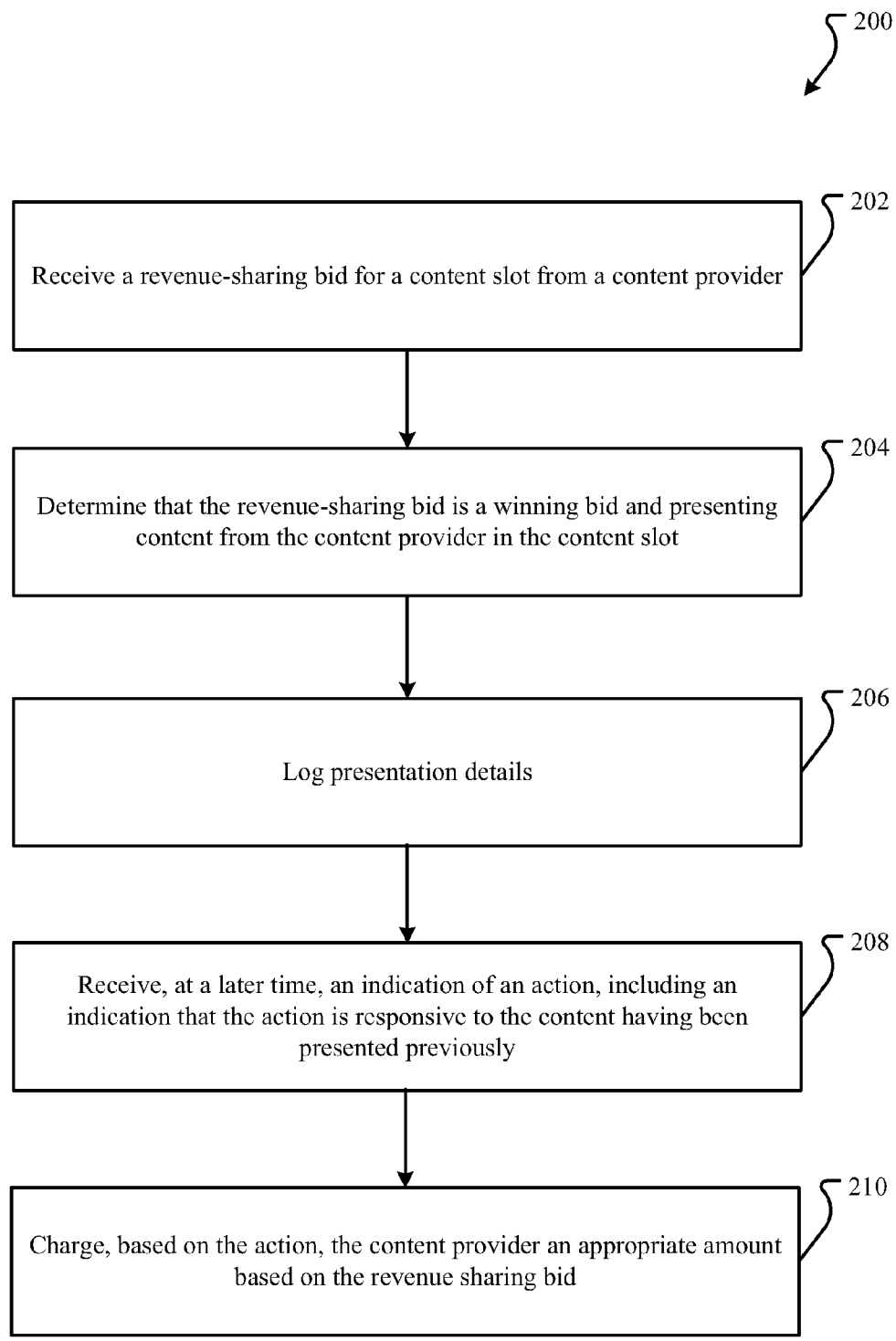
FIG. 2 is a flow diagram of an example process for managing bids in an auction.

FIG. 2 is a simplified example process 200 for determining whether a purchase is associated with a revenue-sharing advertisement and charging a merchant a price that is based at least in part on that determination.

The process 200 begins when an advertising management system receives a revenue-sharing bid for a content slot from a content provider (e.g., an advertiser or a merchant) (202). The advertising management system can receive and process the bid as described below with regard to FIGS. 4, 5A, and 5B. After the advertising management system has received the revenue-sharing bid, the advertising management system determines that the revenue-sharing bid is a winning bid and presents content (e.g., an advertisement) from the content provider in the content slot (204). For example, after the advertising management system has received the revenue-sharing bid, the advertising management system determines that the revenue-sharing bid is a winning bid and presents content from the content provider that submitted the winning bid. For example, a user may be shown an advertisement that, when clicked by the user, causes the user to be redirected to a web site owned by the content provider.

After presenting content associated with the winning revenue-sharing bid, the details of the content presentation are logged (206). Logging the presentation details can include, for example, recording the time that the content was presented, the manner in which is was presented (e.g., as an image, or as a link in a list of search results). Logging the presentation details can also include logging the activation of presented content (e.g., logging a user's click of a provided advertisement). The manner in which the content presentation details are stored may vary, but can include storing a file (e.g., a "cookie") on the user's machine that contains the details of one or more of a user's previous sessions with one or more web sites. In some examples, logging the presentation details does not occur until after a user has activated at least a portion of the presented content.

Assuming that the user eventually interacts with the web site provided by the content provider, an indication of the user's action is provided to the advertising management system (208). The indication can include an indication that the user's action was responsive to the content having been presented previously (208). For example, suppose a user has been previously presented with an advertisement for a merchant's web site, and that the user clicked the advertisement to visit the merchant's web site. If the user purchases an item (e.g., a widget) from the merchant's web page, an indication of this action will be reported to the advertising management server. In this example, the indication might include an indication that the user originally visited the merchant's web site as a result of clicking on an advertisement associated with a winning revenue-sharing bid. The advertising management system can receive the indication of the user's previous exposure to the content (e.g., the advertisement) in the form of a cookie that was stored on the user's machine.

After the advertising management system has received an indication of an action (e.g., a user's purchase of a widget from the content provider) that includes an indication that the action was responsive to the content having been presented previously to the user, the advertising management system can charge the content provider a price that is based on the revenue sharing bid (210). Because the advertising management system has details regarding both the user's original exposure to the content provider's web site and the eventual transaction (regardless of whether the exposure and transaction occurred during the same session), the advertising management system is able to accurately determine whether the transaction actually resulted from the presentation of content associated with a revenue sharing bid. Thus, the advertising management system can avoid charging content providers on basis of revenue sharing bids unless the advertisements associated with those bids actually generated the eventual transaction. Likewise, by collecting the details of content presentation and associating those details with the eventual transactions between a user and a content provider, the advertising management system is able to fairly charge the content providers for transactions facilitated by the presented content.

Figure 3:
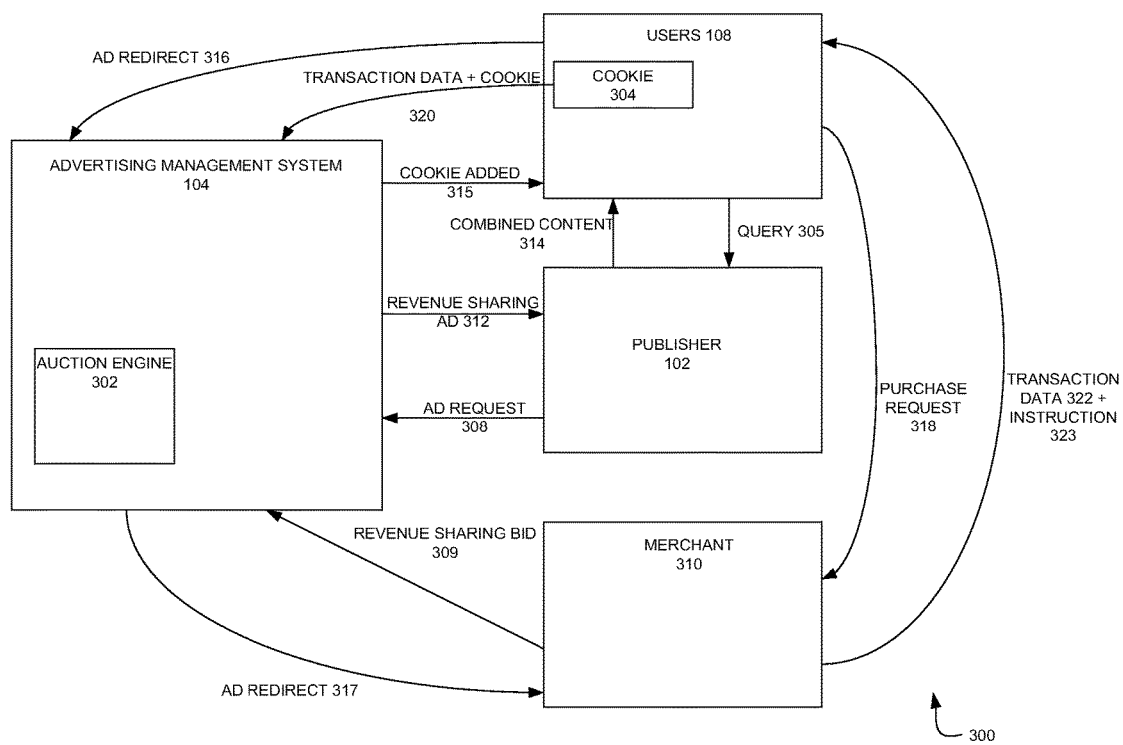
FIG. 3 is a block diagram of another example online advertising system.

FIG. 3 is an exemplary system 300 that includes an advertising management system 104, one or more users 108, a publisher, 102, and a merchant 310. FIG. 3 is a more detailed illustration of the exemplary process 200 described above with regard to FIG. 2. In some examples, the publisher 102 is a search service that receives a query 305 for search results. In response, the search service can retrieve relevant search results from an index of documents (e.g., from an index of web pages). Upon receiving the query (and while the search service attempts to service the query), the publisher 102 can submit a request for ads 308 to the advertising management system 104 which may include a number of ads desired. Components of the advertising management system 104, such as auction engine 302, attempt to identify appropriate advertisements to provide to the user 108 via publisher 102, and may further conduct an auction to determine which of the identified appropriate advertisements will actually be shown to the user in one or more content slots.

As part of the auction process, the auction engine 302 attempts to determine a winning bid from a plurality of bids received from various content providers. In the example of FIG. 3, one of the candidate bids is a revenue sharing bid 309 received from the merchant 310. In some examples, the auction engine 302 uses the techniques described below with regard to FIGS. 4, 5A, and 5B in determining that the revenue sharing bid 309 is the winning bid.

After the advertising management system 104 has determined that the revenue sharing bid 309 is the winning bid, the advertising management system forwards a revenue sharing advertisement 312 to the publisher 102. The publisher 102 then combines the search results (or other requested content) with one or more of the revenue sharing advertisements provided by the advertising management system 104. This combined content 314 can then be forwarded to the user 108 that submitted the query 305. The search results can be maintained as distinct from the ads, so as not to confuse the user between paid advertisements and presumably neutral search results. The publisher can transmit information about the advertisement and when, where, and/or how the advertisement was rendered back to the advertising management system 104.

In some examples, advertisers may create revenue sharing bids with keyword and other targeting options through controls which allow advertisers to bid increased amounts for certain products or product categories to show up for certain queries. The targeting controls may also be based on features of the user (e.g., a geographic location of a user, and whether or not the user is a "repeat customer"). These features allow advertisers to prioritize certain populations (e.g., user who are physically located near a real store) or types of customers (e.g., new customers and/or existing customers).

Upon receiving the combined content 314, the user 108 may activate (e.g., the user may select/click on the ad) the revenue-sharing advertisement presented with the combined content 214, and will be redirected 316, 317 to the URL associated with the advertisement via the advertising management system 104. Activation can include selecting an ad, hovering over an ad, or other interaction with the ad. After the user activates the advertisement, the advertising management system is notified of the action. In some implementations, notification can be by way of a redirect (i.e., the click through is processed by the advertising management system thereby providing details of the activation to the advertising management system). Alternatively, the advertiser can provide the activation information directly to the advertising management system.

In some implementations when a redirect is used, the advertising management system 104 can place a cookie 304 on the machine being used by the user 108 (315). The cookie can be used to link the activation of the ad with a subsequent transaction as described in greater detail below. In some implementations, the cookie 304 stores details regarding when and how the user was presented with the advertisement, when the user clicked on that advertisement, and information that identifies the destination linked to the revenue-sharing advertisement (e.g., the URL to which the user 108 will be directed to upon clicking the advertisement). The cookie 304 may also contain an identifier which uniquely identifies the original advertisement that generated the click to the merchant's web site and publisher information. Other information can be included. The advertising management system 104 can log that a click/activation occurred on the revenue-sharing advertisement, and can associate that click/activation with the cookie 304 so that the advertising management system 104 can charge the advertiser and credit the publisher in accordance with the revenue sharing bid. In some implementations, the cookie 304 can be configured to reside on the user's 108 machine for a predetermined period of time (e.g., the cookie can be configured to expire after thirty days, or to remain in the user's machine until deleted).

Once the user has been directed/redirected to the landing page associated with a given ad (e.g., the web site of the merchant 310), the user 108 may browse content (e.g., on the web site) or may elect to initiate a commercial transaction with the merchant 310. For example, the user may decide to purchase a widget from the merchant 310 after browsing the merchant's 210 web site, and a purchase request 318 can be transmitted to the merchant 310. In general, the purchase request 318 embodies an example of an initiated and/or completed action/transaction between the user 108 and the merchant 310. Other examples of completed actions are possible such as registering for a service, providing information, or completing a survey. For example, the purchase request 318 could result from the user 108 adding a widget to his online "shopping cart," entering payment information, and confirming the transaction. The user 108 can also transmit the purchase request 318 in a subsequent session (e.g., the user may revisit the merchant's 310 web site to purchase a widget two weeks after initially visiting the merchant's 310 web site as a result of clicking the revenue sharing advertisement). In some implementations, advertisers may specify the amount of time after the initial ad click/activation after which the advertising management system 104 will retain an interest in the purchase. This allows advertisers to maintain their return on investment with greater precision.

After receiving the purchase request 318, the merchant responds by providing transaction data 322 to the user 108. In some implementations, the transaction data 322 includes an identification of the merchant 310, a final sale price associated with the transaction, the number, type, and identification of the goods or services purchased, and other information. In some implementations, the transaction data 322 also includes an instruction 323 that causes the user to make page request (or other "call") to the advertising management system 104. In some examples, the instruction 323 is a URL that is provided to the user 108 in the form of an image (or image tag) or a portion of HTML that appears on the merchant's 310 web site. In general, the instruction 323 causes the user's 108 machine to call the advertising management system 104 to transmit both the transaction data 322 and the cookie 304 to the advertising management system 104 in the page request. For example, when the user views an image on the merchant's 310 web site, the user's 108 machine (i.e., browser) is instructed to make an HTTP request back to the advertising management system 104 to obtain the content of the image, with the request being of the form of a page request for the URL of the image. When the request is made, the user 108 (e.g., the user's browser) transmits both the transaction data 322 and the cookie 304 (e.g., the cookie 304 placed by the advertising management system 104 can be associated with a domain and the URL page request to the same domain can automatically couple to the cookie 304 to the request) to the advertising management system 104 in the request 320.

Having received both the transaction data 322 that identifies the transaction details and the cookie 304 that identifies the details associated with the original advertisement presentation, the advertisement management system 104 can associate conversion information with information about the revenue sharing advertisement. The advertisement management system 104 can then associate the purchase/transaction with the original advertisement (details of which having been logged on the advertising management system 104), charge the advertiser an appropriate amount (based on the revenue share), and credit the publisher (in this example the search service). In some implementations the information can also be used to predict future events, traffic going to the advertiser (e.g. click through rates, conversion rates), and to generate a final cost for each purchase.

In some implementations, instead of storing the cookie 304 on the user's 108 machine or providing the URL to the user, the merchant 310 may store presentation details and or transaction details. The merchant may then periodically report a batch of transactions directly to the advertising management system 104 for processing. This technique may benefit the advertising management system 104 in that it does not require the user 108 to maintain the cookie 304 on his machine for an extended time period.

There are numerous ways of receiving information related to activation of an advertisement and or/transactions such as purchases and conversions. In some examples, conversion tracking involves feeding a unique identification for each advertisement activation (e.g., click of an advertisement by a user) to the advertiser via a URL. The advertiser then passes that identification back to the advertising management system as part of the page request to the advertising management system to allow the advertising management system to identify the user.

In some implementations, the advertising management system may host the purchase pages, which allows the advertising management system to charge the advertiser without requiring information to be transmitted by the advertiser. That is, in some examples, the advertising management system can tie a conversion directly to the stored cookie when the user completes a transaction, even if the action is generated through the advertiser's web site.

The merchant 310 may also report canceled transactions to the advertising management system 104 in order to reclaim revenue sharing advertising costs that were paid on transactions that were eventually canceled or refunded. For example, if a user 108 purchases a widget from merchant 310 as described above, the merchant 310 would pay the advertising management system 104 based on a portion of that sale. If the user eventually returns the widget or cancels the transaction, the merchant 310 can report this cancelation or return to the advertising management system 104 to recoup those advertising costs.

Figure 4:
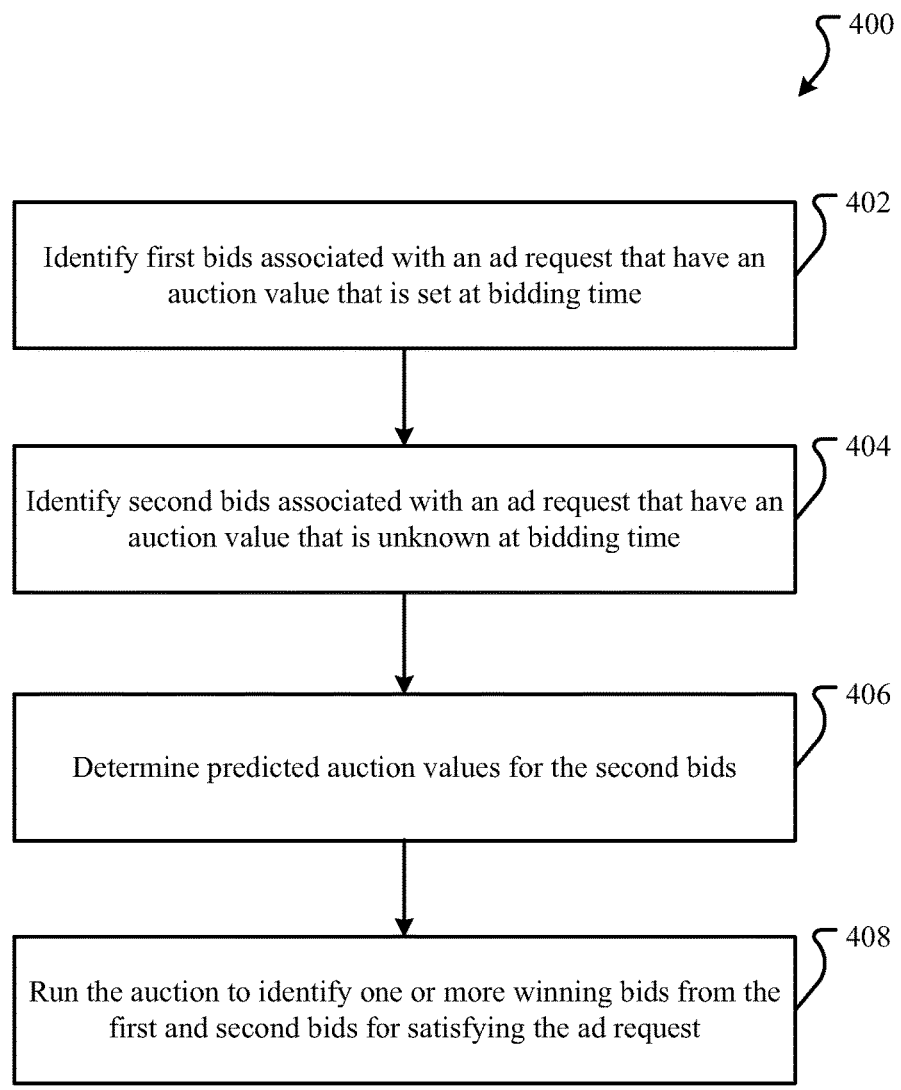
FIG. 4 is a flow diagram of an example process for managing a revenue-sharing bid.

FIG. 4 is a simplified example process 400 for combining bids that have an auction value that is set at bidding time (e.g., cost-per-click bids) with bids that have an auction value that is unknown at bidding time (e.g., revenue-sharing bids). Auctions that include both cost-per-click bids and revenue-share bids are referred to as mixed auctions. In some examples, the advertising management system 104 can perform the techniques associated with the process 400. The advertising management system 104 identifies bids that are associated with an ad request that have an auction value that is set at bidding time (402). For example, the advertising management system 104 can identify cost-per-click bids submitted by advertisers, and the cost-per-click bids can have an auction value of:

$$eCPM = 1000 \times CPC \times (\text{Probability of Click})$$

Likewise, the advertising management system 104 identifies bids that are associated with an ad request that have an auction value that is unknown at bidding time (404). For example, the advertising management system 104 can identify bids that are revenue-sharing bids.

After the advertising management system 104 has identified one or more bids having values that are unknown at bidding time, the advertising management system 104 determines predicted auction values for those bids (406). In some implementations, the advertising management system 104 determines predicted auction values for bids having unknown values by creating proxy values of those bids through the use of predictive models. After the advertising system 104 creates proxy values for one or more of the bids having unknown values, the advertising system 104 conducts an auction to identify one or more "winning" bids that satisfy an ad request (408). Because the advertising management system 104 is able to assign proxy values to bids with unknown values, bids such as revenue-share bids can be evaluated against traditional cost-per-click bids whose values are known. The manner in which proxy values are assigned is described in further detail below.

Figure 5A:
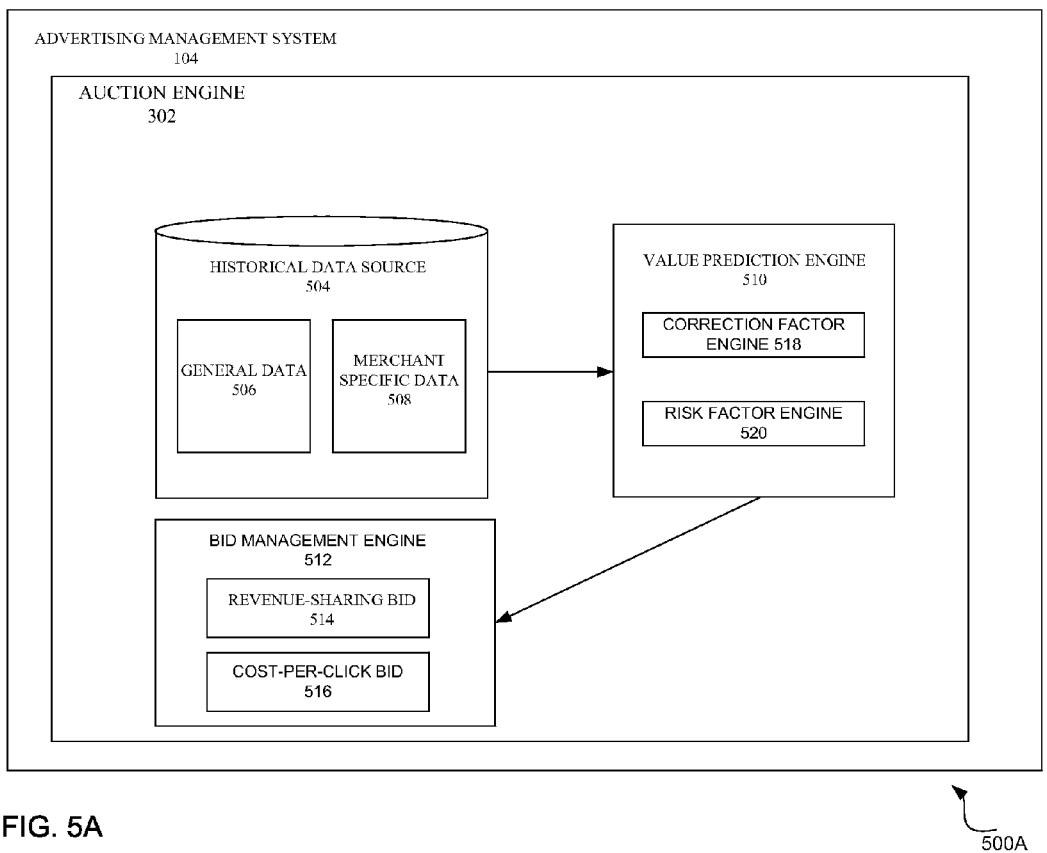
FIG. 5A is a block diagram of another example online advertising system.

FIG. 5A is an example system 500A that includes the advertising management system 104 and various subcomponents. The advertising management system 104 includes an auction engine 302 to perform one or more of the functions described above, such as ordering bids, second-pricing bids, and executing auctions. The advertising management system 104 also includes a bid management engine 512 for managing different types of bids for advertisements, such as revenue-sharing bid 514 and cost-per-click bid 516. The advertising management system 104 also includes a value prediction engine 510 that communicates with both a historical data source 504 and the bid management engine 512. The historical data source 504 includes various types of data, such as general data (e.g., general commercial activity data and general trend data) and merchant specific data 508.

The value prediction engine 510 controls the determination of proxy values for revenue-sharing bid 514. Like with cost-per-click bids, an eCPM value can be calculated for revenue-sharing bid 514 using, for example, predictive models. For example, because a cost-per-click value does not exist for the revenue-sharing bid 514, the eCPM value is calculated differently for the revenue-sharing bid 314. The value prediction engine 510 uses the following formula to calculate a proxy eCPM value for the revenue-sharing bid 514:

$$eCPM = 1000 \times (\text{Expected Purchase Value}) \times (\text{Revenue Share}) \times (\text{Probability of Purchase})$$

In general, the Revenue Share is a known value, as it represents the percentage of each sale that a merchant is willing to pay in lieu of a cost-per-click. For example, instead of submitting a bid based on a cost-per-click, a merchant may choose to submit a bid based on payment of 10% of each sale. Thus, the Revenue Share would be 10%–a known quantity.

In some examples, the value prediction engine 510 estimates the Expected Purchase Value and Probability of Purchase factors. In some implementations, these factors are a function of many variables. The Expected Purchase Value can represent the amount of money a customer is expected to spend when completing a purchase associated with an impression, and the Probability of Purchase factor can represent the likelihood that a customer will complete a purchase with a particular merchant given the impression. In some examples, the value prediction engine 510 uses the general data 506 and the merchant specific data 508 stored in historical data source 504 to predict values for the revenue-sharing bid 514, and for the Expected Purchase Value and Probability of Purchase factors, specifically.

In the case where the advertising management system 104 has no available data for a merchant that submits a revenue-sharing bid (e.g., a newly-formed merchant), the value prediction engine 510 can use general data 506 in order to predict values for unknown factors. For example, if a new merchant that deals in cameras submits a revenue-sharing bid, the value prediction engine 510 can examine general data 506 to identify the Expected Purchase Value and Probability of Purchase factors of other camera merchants. The value prediction engine 510 can also attempt to estimate values for these factors by examining general data 506 that relates to past purchases given similar queries, or past purchases given similar categories of products. For example, cameras might be classified as being in the "electronics" category, so the value prediction engine 510 could use general data 506 from past electronics purchases to estimate values for the Expected Purchase Value and Probability of Purchase factors. Likewise, if the revenue-sharing bid is associated with a query such as "cheap cameras," the value prediction engine 510 could use general data 506 to identify the Expected Purchase Value and Probability of Purchase associated with past purchases that occurred in connection with a similar or identical query. Estimates can also consider a merchant ratings, a size of the merchant, a quality of the merchant's website, and other factors.

If the historical data source 504 contains sufficient data from past transactions with a merchant that has submitted a revenue-sharing bid, the value prediction engine can also use merchant specific data 508 to determine values for the Expected Purchase Value and Probability of Purchase factors. For example, if a merchant submitting a revenue-sharing bid has submitted a number of such bids in the past and had completed sales in connection with those previous bids, historical data source 504 may already contain useful Expected Purchase Value and Probability of Purchase factor values (in the form of merchant specific data 508) that can be used to determine current Expected Purchase Value and Probability of Purchase factor values.

Merchant specific data can also include modifiers that affect the Expected Purchase Value. For example, the merchant specific data 508 may include statistics that show that when a particular merchant sells a camera with a purchase price of $300, the customer usually ends up purchasing $330 worth of goods from that merchant. In that case, the merchant may have a Expected Purchase Value modifier of 1.1, as the merchant's sales have historically resulted in a 10% higher revenue than the item targeted by the ad associated with the revenue-sharing bid. Thus, for future revenue-sharing bids, the Expected Purchase Value can be increased by 10% to reflect that merchant's historic trend of upselling customers. Factor modifiers can also be based on general data 506. For example, if the general data 506 shows that the purchase of electronic items usually results in a 10% higher total purchase price than the price of the targeted item, a similar modifier to that described above can be applied to the Expected Purchase Value. Positive and negative modifiers can be used in conjunction with determining the Expected Purchase Value and Probability of Purchase factor values. In this way, the initial eCPM can be made more accurate.

As with cost-per-click bids, once an initial eCPM value has been determined using the formula eCPM=1000×(Expected Purchase Value)×(Revenue Share)×(Probability of Purchase), the value prediction engine 510 or the bid management engine 512 can determine a second price for the revenue sharing bid 514, as well as any other bids in the second auction (e.g., cost-per-click bid 516). In some examples, the second price for a mixed auction can be computed in the form of a correction factor "k." The correction factor k can be immediately applied to any values known at impression time (e.g., the cost-per-click value) and, especially in the case of revenue share bids, can be stored for use at a time when true values (e.g., an actual purchase price) are known. In some implementations, the correction factor k is calculated according to the following formula:

$$k=(\text{maximum eCPM of second place bidder/maximum eCPM of self})$$

As described below with regard to FIG. 5B, the correction factor k can be modified based on other factors, such as auctioneer risk. Once the value of k has been calculated, the correction value k can be used to calculate the final cost of a revenue share purchase according to the formula:

$$\text{final cost}=k \times (\text{Revenue Share}) \times (\text{Actual Purchase Amount})$$

Figure 5B:
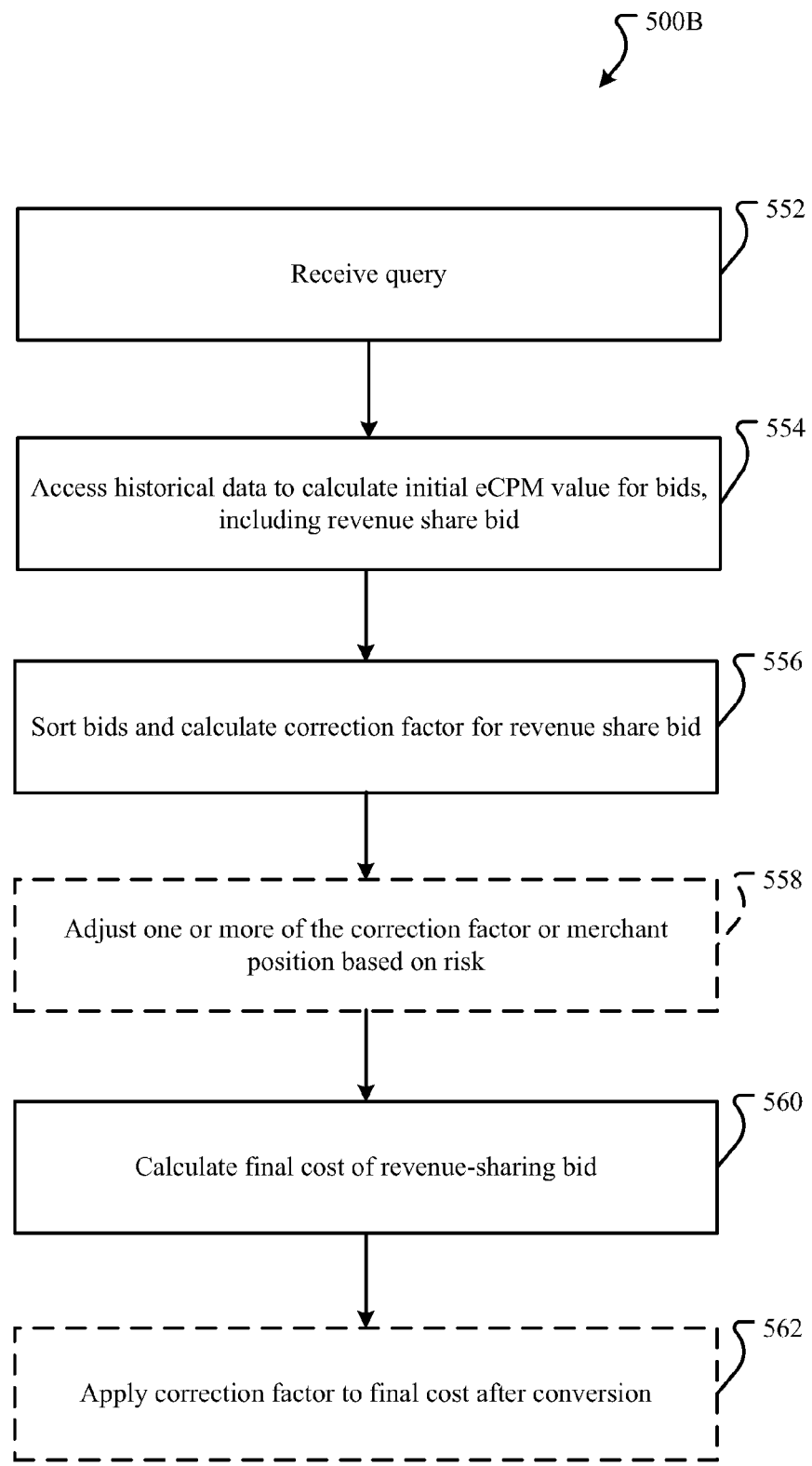
FIG. 5B is a flow diagram of an example process for managing bids in an auction.

An example of how the correction value k can affect the final cost of a revenue share purchase is shown in the example of FIG. 5B below.

FIG. 5B is an example process 500B for determining an initial value and a second price for a revenue share bid. This example illustrates a case in which a merchant ("Merchant X") has agreed to participate in a revenue-sharing bid arrangement, whereby 10% of Merchant X's sales would be paid as commission to the auctioneer associated with the advertising management system 104. The example illustrated in FIG. 5B also assumes that merchant-specific historical data is available for Merchant X. FIG. 5B further illustrates an example in which an auction contains both cost-per-click and revenue-sharing bids.

The process 500B begins when the advertisement system 104 receives a query (sometimes referred to as a "query event") (552). For example, a customer submits a query (e.g., in a search engine) for a widget, and Merchant X's widget appears in the candidate list for widgets. The value prediction engine 510 accesses the historical data source 504 in order to calculate an initial eCPM value for both revenue-sharing and cost-per-click bids (554). The value prediction engine 510 uses general data 506 and merchant specific data 508 to determine that, historically, customers submitting a query for widgets click on advertisements for widgets 10% of the time, purchase widgets from the advertised merchant 5% of the time that they click on the advertisement and, for widgets valued at $50, customers usually have a total purchase price of $55. Thus, in the example of FIG. 5B, the initial eCPM for the Merchant X's revenue sharing bid is:

$$\text{eCPM}=1000 \times (\text{Expected Purchase Value}) \times (\text{Revenue Share}) \times (\text{Probability of Purchase}); \text{ or:}$$

$$\text{eCPM}=1000 \times (\$55) \times (10\%) \times (5\%) = \$275$$

The eCPM is also calculated for the cost-per-click bids.

After all the initial eCPM values have been calculated (and any incremental value has been added to a bid, such as $0.01), all of the bids are sorted by their eCPM values to allow for the value prediction engine to calculate the correction factor k (556). For example, assume that the operations discussed above result in the following sorted list of bids:

Bid A (CPC bid 1): $300
Bid B (Merchant X's revenue-sharing bid): $275
Bid C (CPC bid 2): $165

The correction factor for Merchant X's revenue-sharing bid is calculated as follows:

$$k=(\text{maximum eCPM of second place bidder/maximum eCPM of self});$$

or $$k(\text{Bid }B)=\$165/\$275=0.6$$

Thus, the correction factor k for Merchant X's revenue-sharing bid is 0.6.

In some examples, a risk factor engine 520 can optionally modify the value of the correction factor k (558). The risk factor engine 520 can use general data 506 or merchant-specific data 508 in order to modify the correction factor based on historical risk associated with Merchant X or any similar transactions. For example, if the risk factor engine 520 determines (from either or both of general or merchant specific data) that a revenue-sharing bid is risky, the correction factor k can be adjusted to account for the risk assumed by the auctioneer in accepting a revenue-sharing bid. For instance, if historical data shows that purchases of widgets are risky, the risk factor engine 520 can adjust the correction factor k by, for example, 10%, with its adjusted value being 0.66. In addition to (or instead of) adjusting the correction factor k by 10%, the risk factor engine can also force Merchant X into a position that is 10% dollars lower than his current position. For example, the following new sorted list of bids could result from this type of risk adjustment:

Bid A (CPC bid 1): $300
Bid B (Merchant X's revenue-sharing bid): $247.5
Bid C (CPC bid 2): $165

In this example, the order of the bids would not change as a result of this type of risk adjustment. However, this type of risk adjustment can influence advertisers to bid higher amounts to overcome their risk penalty in an effort to remain competitive with other bidders.

Assuming that the risk factor engine 520 accounted for risk by adjusting the correction factor k to equal 0.66, and that the customer eventually purchased a widget from Merchant X for $50, the advertisement management system 104 can calculate the final cost (or second price) of the purchase. In this example, the final cost of the purchase would be calculated (560) as:

$$\text{final cost} = k \times (\text{Revenue Share}) \times (\text{Actual Purchase Amount}); \text{ or}$$

$$\text{final cost} = 0.66 \times (10\%) \times (\$50) \approx \$2.18$$

Thus, Merchant X would owe the auctioneer $2.18.

In some examples, in contrast to the modification of a cost-per-click bid in which a correction factor is applied immediately (e.g., before a purchase occurs), in a revenue-sharing bid, the correction factor can be applied to the bid after the conversion (e.g., the purchase) occurs (562). In this way, the auctioneer can decrease (or increase) the cost of the revenue-share purchase according to the correction factor after the true values are known for a particular transaction.

As described above, an actual purchase amount (a "price component") is required to be determined in order to calculate how much an advertiser is charged for a given revenue-sharing bid. In order to determine the price component, a determination is made as to which activities of the customer are to be attributed to a given presentation of an ad (or a series of ads). In some implementations, a bid may be associated with a single product or service, related products or services, a category, multiple categories of products or services, a time window, a location, or other parameters. The determination of which activities of a user are attributable to which bid can be made by agreement between the parties. Multiple bids may also be associated with a singular activity (e.g., the purchase of a singular product may be attributable to two different bids). Accordingly, many different types of revenue sharing between the advertiser, publisher and advertising system are possible.

Upon completing the transaction, the historical data can be updated to reflect the details of the transaction, which improves the accuracy of the eCPM calculations. For example, the general data 506 can be updated for the general sales of widgets, and merchant-specific data 508 for Merchant X can be updated to reflect some other circumstance of the transaction. For example, if Merchant X consistently sells widgets to 50% of the users that click on Merchant X's advertisements, the Probability of Purchase factor can be updated to reflect this trend. Merchant X's risk factor can also be raised or lowered as a result of trending data related to his transactions, or to transactions within Merchant X's general industry, transactions with merchants of similar size to Merchant X, and the like.

Figure 6:
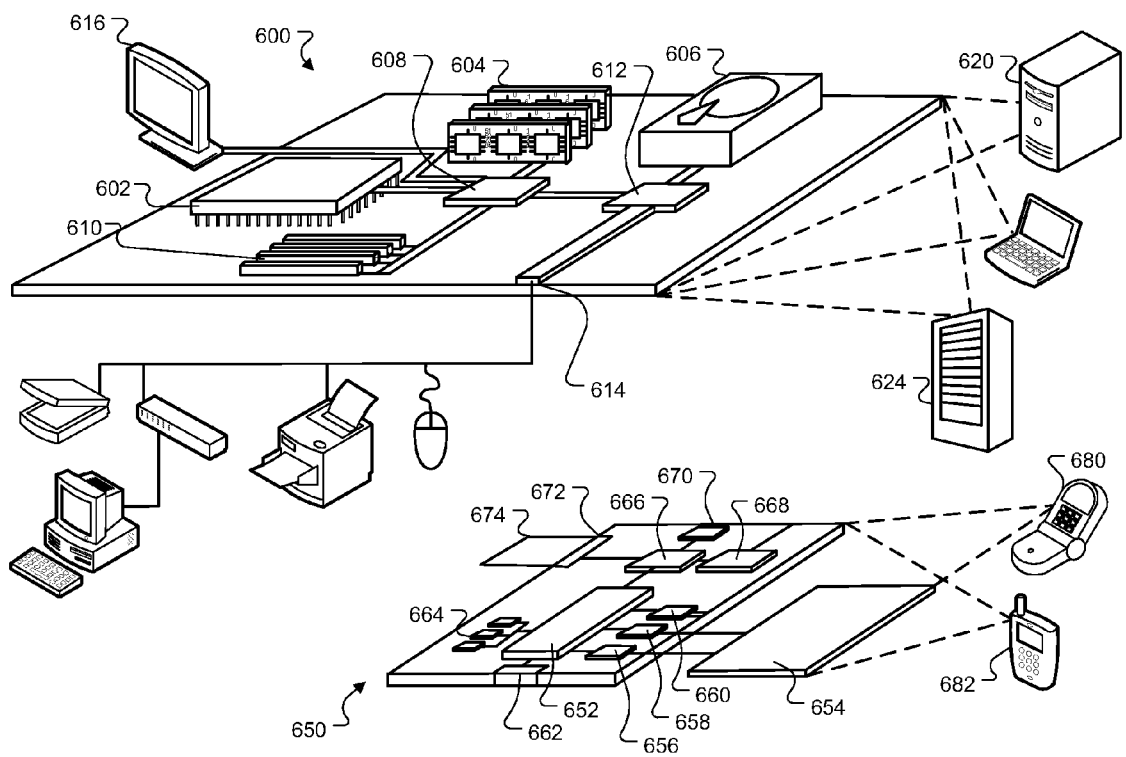
FIG. 6 is a block diagram of exemplary computing systems.

FIG. 6 shows an example of a computing device 1000 and a mobile computing device 650 that can be used to implement the techniques described here. The computing device 600 is intended to represent various forms of digital computers, such as laptops, desktops, workstations, personal digital assistants, servers, blade servers, mainframes, and other appropriate computers. The mobile computing device 650 is intended to represent various forms of mobile devices, such as personal digital assistants, cellular telephones, smart-phones, and other similar computing devices. The components shown here, their connections and relationships, and their functions, are meant to be examples only, and are not meant to be limiting.

The computing device 600 includes a processor 602, a memory 604, a storage device 606, a high-speed interface 608 connecting to the memory 604 and multiple high-speed expansion ports 610, and a low-speed interface 612 connecting to a low-speed expansion port 614 and the storage device 606. Each of the processor 602, the memory 604, the storage device 606, the high-speed interface 608, the high-speed expansion ports 610, and the low-speed interface 612, are interconnected using various busses, and may be mounted on a common motherboard or in other manners as appropriate. The processor 602 can process instructions for execution within the computing device 600, including instructions stored in the memory 604 or on the storage device 606 to display graphical information for a GUI on an external input/output device, such as a display 616 coupled to the high-speed interface 608. In other implementations, multiple processors and/or multiple buses may be used, as appropriate, along with multiple memories and types of memory. Also, multiple computing devices may be connected, with each device providing portions of the necessary operations (e.g., as a server bank, a group of blade servers, or a multi-processor system).

The memory 604 stores information within the computing device 600. In some implementations, the memory 604 is a volatile memory unit or units. In some implementations, the memory 604 is a non-volatile memory unit or units. The memory 604 may also be another form of computer-readable medium, such as a magnetic or optical disk.

The storage device 606 is capable of providing mass storage for the computing device 600. In some implementations, the storage device 606 may be or contain a computer-readable medium, such as a floppy disk device, a hard disk device, an optical disk device, or a tape device, a flash memory or other similar solid state memory device, or an array of devices, including devices in a storage area network or other configurations. Instructions can be stored in an information carrier. The instructions, when executed by one or more processing devices (for example, processor 602), perform one or more methods, such as those described above. The instructions can also be stored by one or more storage devices such as computer- or machine-readable mediums (for example, the memory 604, the storage device 606, or memory on the processor 602).

The high-speed interface 608 manages bandwidth-intensive operations for the computing device 600, while the low-speed interface 612 manages lower bandwidth-intensive operations. Such allocation of functions is an example only. In some implementations, the high-speed interface 608 is coupled to the memory 604, the display 616 (e.g., through a graphics processor or accelerator), and to the high-speed expansion ports 610, which may accept various expansion cards (not shown). In the implementation, the low-speed interface 612 is coupled to the storage device 606 and the low-speed expansion port 614. The low-speed expansion port 614, which may include various communication ports (e.g., USB, Bluetooth, Ethernet, wireless Ethernet) may be coupled to one or more input/output devices, such as a keyboard, a pointing device, a scanner, or a networking device such as a switch or router, e.g., through a network adapter.

The computing device 600 may be implemented in a number of different forms, as shown in the figure. For example, it may be implemented as a standard server 620, or multiple times in a group of such servers. In addition, it may be implemented in a personal computer such as a laptop computer 622. It may also be implemented as part of a rack server system 624. Alternatively, components from the computing device 600 may be combined with other components in a mobile device (not shown), such as a mobile computing device 650. Each of such devices may contain one or more of the computing device 600 and the mobile computing device 650, and an entire system may be made up of multiple computing devices communicating with each other.

The mobile computing device 650 includes a processor 652, a memory 664, an input/output device such as a display 654, a communication interface 666, and a transceiver 668, among other components. The mobile computing device 650 may also be provided with a storage device, such as a micro-drive or other device, to provide additional storage. Each of the processor 652, the memory 664, the display 654, the communication interface 666, and the transceiver 668, are interconnected using various buses, and several of the components may be mounted on a common motherboard or in other manners as appropriate.

The processor 652 can execute instructions within the mobile computing device 650, including instructions stored in the memory 664. The processor 652 may be implemented as a chipset of chips that include separate and multiple analog and digital processors. The processor 652 may provide, for example, for coordination of the other components of the mobile computing device 650, such as control of user interfaces, applications run by the mobile computing device 650, and wireless communication by the mobile computing device 650.

The processor 652 may communicate with a user through a control interface 658 and a display interface 656 coupled to the display 654. The display 654 may be, for example, a TFT (Thin-Film-Transistor Liquid Crystal Display) display or an OLED (Organic Light Emitting Diode) display, or other appropriate display technology. The display interface 656 may comprise appropriate circuitry for driving the display 654 to present graphical and other information to a user. The control interface 658 may receive commands from a user and convert them for submission to the processor 652. In addition, an external interface 662 may provide communication with the processor 652, so as to enable near area communication of the mobile computing device 650 with other devices. The external interface 662 may provide, for example, for wired communication in some implementations, or for wireless communication in other implementations, and multiple interfaces may also be used.

The memory 664 stores information within the mobile computing device 650. The memory 664 can be implemented as one or more of a computer-readable medium or media, a volatile memory unit or units, or a non-volatile memory unit or units. An expansion memory 674 may also be provided and connected to the mobile computing device 650 through an expansion interface 672, which may include, for example, a SIMM (Single In Line Memory Module) card interface. The expansion memory 674 may provide extra storage space for the mobile computing device 650, or may also store applications or other information for the mobile computing device 650. Specifically, the expansion memory 674 may include instructions to carry out or supplement the processes described above, and may include secure information also. Thus, for example, the expansion memory 674 may be provide as a security module for the mobile computing device 650, and may be programmed with instructions that permit secure use of the mobile computing device 650. In addition, secure applications may be provided via the SIMM cards, along with additional information, such as placing identifying information on the SIMM card in a non-hackable manner.

The memory may include, for example, flash memory and/or NVRAM memory (non-volatile random access memory), as discussed below. In some implementations, instructions are stored in an information carrier. that the instructions, when executed by one or more processing devices (for example, processor 652), perform one or more methods, such as those described above. The instructions can also be stored by one or more storage devices, such as one or more computer- or machine-readable mediums (for example, the memory 664, the expansion memory 674, or memory on the processor 652). In some implementations, the instructions can be received in a propagated signal, for example, over the transceiver 668 or the external interface 662.

The mobile computing device 650 may communicate wirelessly through the communication interface 666, which may include digital signal processing circuitry where necessary. The communication interface 666 may provide for communications under various modes or protocols, such as GSM voice calls (Global System for Mobile communications), SMS (Short Message Service), EMS (Enhanced Messaging Service), or MMS messaging (Multimedia Messaging Service), CDMA (code division multiple access), TDMA (time division multiple access), PDC (Personal Digital Cellular), WCDMA (Wideband Code Division Multiple Access), CDMA2000, or GPRS (General Packet Radio Service), among others. Such communication may occur, for example, through the transceiver 668 using a radio-frequency. In addition, short-range communication may occur, such as using a Bluetooth, WiFi, or other such transceiver (not shown). In addition, a GPS (Global Positioning System) receiver module 670 may provide additional navigation- and location-related wireless data to the mobile computing device 650, which may be used as appropriate by applications running on the mobile computing device 650.

The mobile computing device 650 may also communicate audibly using an audio codec 660, which may receive spoken information from a user and convert it to usable digital information. The audio codec 660 may likewise generate audible sound for a user, such as through a speaker, e.g., in a handset of the mobile computing device 650. Such sound may include sound from voice telephone calls, may include recorded sound (e.g., voice messages, music files, etc.) and may also include sound generated by applications operating on the mobile computing device 650.

The mobile computing device 650 may be implemented in a number of different forms, as shown in the figure. For example, it may be implemented as a cellular telephone 680. It may also be implemented as part of a smart-phone 682, personal digital assistant, or other similar mobile device.

Various implementations of the systems and techniques described here can be realized in digital electronic circuitry, integrated circuitry, specially designed ASICs (application specific integrated circuits), computer hardware, firmware, software, and/or combinations thereof. These various implementations can include implementation in one or more computer programs that are executable and/or interpretable on a programmable system including at least one programmable processor, which may be special or general purpose, coupled to receive data and instructions from, and to transmit data and instructions to, a storage system, at least one input device, and at least one output device.

These computer programs (also known as programs, software, software applications or code) include machine instructions for a programmable processor, and can be implemented in a high-level procedural and/or object-oriented programming language, and/or in assembly/machine language. As used herein, the terms machine-readable medium and computer-readable medium refer to any computer program product, apparatus and/or device (e.g., magnetic discs, optical disks, memory, Programmable Logic Devices (PLDs)) used to provide machine instructions and/or data to a programmable processor, including a machine-readable medium that receives machine instructions as a machine-readable signal. The term machine-readable signal refers to any signal used to provide machine instructions and/or data to a programmable processor.

To provide for interaction with a user, the systems and techniques described here can be implemented on a computer having a display device (e.g., a CRT (cathode ray tube) or LCD (liquid crystal display) monitor) for displaying information to the user and a keyboard and a pointing device (e.g., a mouse or a trackball) by which the user can provide input to the computer. Other kinds of devices can be used to provide for interaction with a user as well; for example, feedback provided to the user can be any form of sensory feedback (e.g., visual feedback, auditory feedback, or tactile feedback); and input from the user can be received in any form, including acoustic, speech, or tactile input.

The systems and techniques described here can be implemented in a computing system that includes a back end component (e.g., as a data server), or that includes a middleware component (e.g., an application server), or that includes a front end component (e.g., a client computer having a graphical user interface or a Web browser through which a user can interact with an implementation of the systems and techniques described here), or any combination of such back end, middleware, or front end components. The components of the system can be interconnected by any form or medium of digital data communication (e.g., a communication network). Examples of communication networks include a local area network (LAN), a wide area network (WAN), and the Internet.

The computing system can include clients and servers. A client and server are generally remote from each other and typically interact through a communication network. The relationship of client and server arises by virtue of computer programs running on the respective computers and having a client-server relationship to each other.

Although a few implementations have been described in detail above, other modifications are possible. For example, while a client application is described as accessing the delegate(s), in other implementations the delegate(s) may be employed by other applications implemented by one or more processors, such as an application executing on one or more servers. In addition, the logic flows depicted in the figures do not require the particular order shown, or sequential order, to achieve desirable results. In addition, other actions may be provided, or actions may be eliminated, from the described flows, and other components may be added to, or removed from, the described systems. Accordingly, other implementations are within the scope of the following claims.

What is claimed is:

1. A method comprising:
    receiving a request for content for filling a content slot that is presented along with search results in a search results page responsive to receipt of a search result query or an ad slot to be filled on a publisher's web page;
    receiving, from a content provider, a revenue-sharing bid for the content slot or the ad slot, the revenue-sharing bid having a cost per mille value that is unknown;
    receiving, from other content providers, cost-per-click bids for the content slot or the ad slot, each cost-per-click bid specifying a cost per mille value;
    conducting a mixed auction with the cost-per-click bids that each specify a cost per mille value, the revenue-sharing bid that has a cost per mille value that is unknown, and additional revenue-sharing bids that each have a cost per mille value that is unknown, including:
        determining, for each cost-per-click bid, a first estimated cost per mille bid for the cost-per-click bid as a mathematical product of the cost per mille value and a probability of a click;
        determining, for each of the additional revenue-sharing bids and the revenue-sharing bid, a second estimated cost per mille bid for the revenue sharing bid as the mathematical product of an expected purchase value that is based on historical data, an amount of a revenue share specified by the revenue-sharing bid, and a probability of a user purchase; and
        conducting the mixed auction using the first estimated cost per mille bid for each of the cost-per-click bids and the second estimated cost per mille bid for each of the additional revenue-sharing bids and for the revenue-sharing bid;
    determining, based on the mixed auction, that the second estimated cost per mille bid of the revenue-sharing bid is a winning bid and presenting content from the content provider in the content slot or the ad slot;
    based on the mixed auction, determining, from among the first estimated cost per mille bids and the second estimated cost per mille bids, a particular estimated cost per mille bid that is a second place bid;
    determining, based on a ratio of the second estimated cost per mille bid that is the winning bid and the particular estimated cost per mille bid that is the second place bid, a correction factor;
    logging presentation details that comprise a time when the content was presented;
    receiving, at a later time, an indication of a product purchase from the content provider, the indication comprising an indication that the product purchase is responsive to the content having been presented previously and a purchase amount;
    charging, based on the purchase amount, the revenue share specified by the revenue-sharing bid, and the correction factor, the content provider an amount;
    receiving, from the content provider, data indicating a return of the product; and
    based on receiving the data indicating the return of the product, refunding, to the content provider, the amount.

2. The method of claim 1, wherein the revenue-sharing bid is a revenue-sharing bid to present the content in a search results page.

3. The method of claim 1, wherein the revenue-sharing bid is a revenue-sharing bid to present the content on the publisher's web page.

4. The method of claim 1, wherein receiving the indication of the product purchase comprises receiving transaction details associated with a user interaction with the content provider that can be attributed to the presentation of the content.

5. The method of claim 1, wherein receiving the indication of the product purchase comprises receiving a page request that comprises transaction details.

6. The method of claim 1, wherein receiving the indication of the product purchase comprises receiving a cookie that comprises details of the content presentation.

7. The method of claim 6, wherein charging the content provider the amount comprises using the cookie to locate the logged presentation details.

8. The method of claim 1, wherein receiving the indication of the product purchase comprises receiving a URL that includes transaction details.

9. The method of claim 1, wherein charging comprises using transaction details about the product purchase and the revenue-sharing bid to charge the content provider.

10. The method of claim 1, wherein the correction factor quantifies an amount of risk of a purchase from the content provider, wherein the correction factor is increased to reflect an increased risk.

11. The method of claim 1, comprising:
logging an expiration time for determining revenue allocation associated with the content presentation; and
determining that the later time when the indication of the product purchase was received is before the expiration time,
wherein charging the content provider the amount is based further on determining that the later time when the indication of the product purchase was received is before the expiration time.

12. The method of claim 1, wherein determining the correction factor comprises mathematically dividing the particular estimated cost per mille bid that is the second place bid by the second estimated cost per mille bid.

13. The method of claim 1, comprising:
computing the amount as a mathematical product of the purchase amount, the revenue share specified by the revenue-sharing bid, and the correction factor.

14. A method comprising:
receiving, from either a client computer associated with a user or a publisher associated with a content source being accessed by the user, a request for content comprising a search request and an ad request;
providing search results in response to the search request;
conducting a mixed auction with both of (i) cost-per-click bids that each specify a cost per mille value and (ii) revenue-sharing bids that each have a cost per mille value that is unknown, including:
determining, for each cost-per-click bid, a first estimated cost per mille bid for the cost-per-click bid as a mathematical product of the cost per mille value and a probability of a click;
determining, for each revenue-sharing bid, a second estimated cost per mille bid for the revenue sharing bid as the mathematical product of an expected purchase value that is based on historical data, an amount of a revenue share specified by the revenue-sharing bid, and a probability of a user purchase; and
conducting the mixed auction using the first estimated cost per mille bid for each of the cost-per-click bids and the second estimated cost per mille bid for each of the revenue-sharing bids;
providing, based on an outcome of the mixed auction, a content item that has a revenue-sharing bid and that has a highest estimated cost per mille bid that won the mixed auction;
determining, based on the outcome of the mixed auction, a particular estimated cost per mille that is second place in the mixed auction;
determining, based on a ratio of the highest estimated cost per mille bid and the particular estimated cost per mille that is second place in the mixed auction, a correction factor;
receiving an indication of a selection of the content item having the revenue-sharing bid and the highest estimated cost per mille bid;
storing a cookie on the client computer including details of the selection;
receiving an indication of a product purchase by the user during a session with a sponsor of the selected content item, including receiving the cookie where the indication is of the form of a uniform resource locator that includes details of the product purchase;
charging the sponsor an amount determined as a product of an amount of the product purchase, the correction factor, and the revenue-sharing bid;
receiving, from the sponsor, data indicating a return of the product; and
based on receiving the data indicating the return of the product, refunding, to the content provider, the amount.

* * * * *